May 20, 1930. J. P. SCHMIDT 1,759,421
COMBINATION VENTILATOR AND SHADE FOR VEHICLES
Filed Feb. 15, 1928
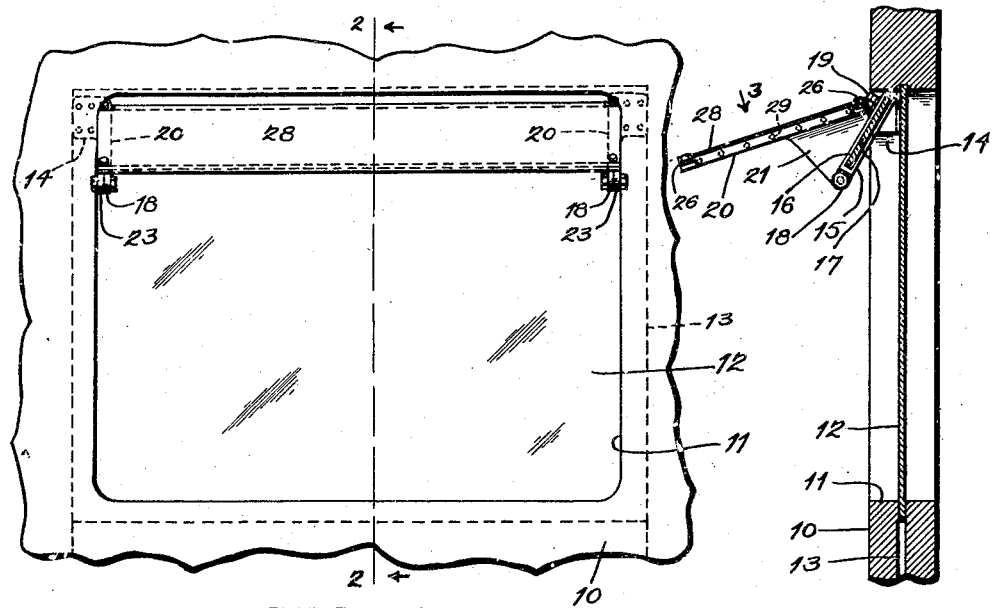
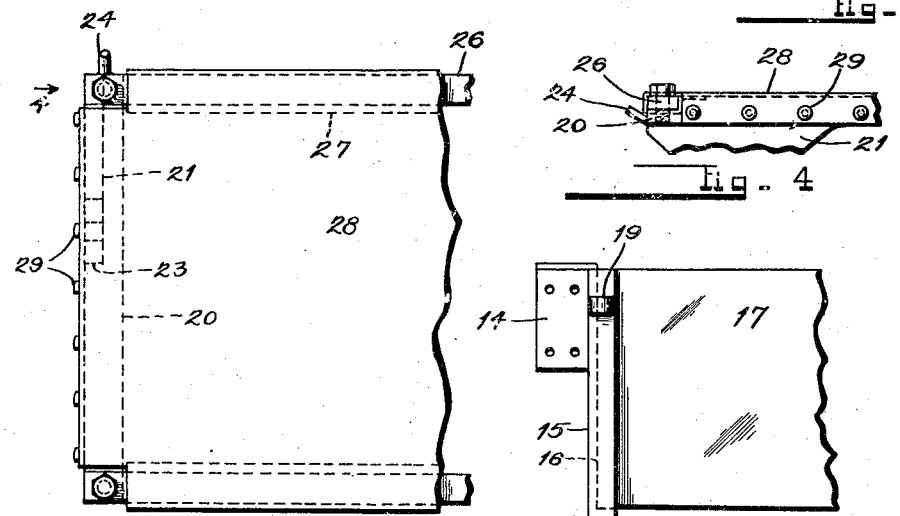
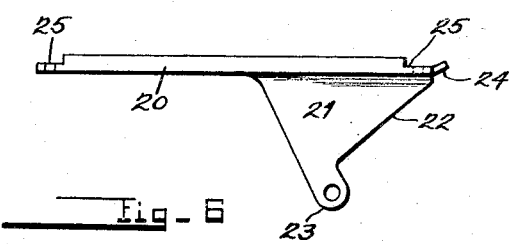
Inventor
John Paul Schmidt Patented May 20, 1930

1,759,421

UNITED STATES PATENT OFFICE

JOHN PAUL SCHMIDT, OF BALTIMORE, MARYLAND

COMBINATION VENTILATOR AND SHADE FOR VEHICLES

Application filed February 15, 1928. Serial No. 254,355.

My invention relates to a combination ventilator and shade for vehicles.

The principal object of my invention is to devise a construction for vehicles which shall be arranged to secure a properly controlled ventilation through the window openings into the interior thereof and also to provide an adequate shade across the same openings against the rays of the sun.

A further object is to devise an arrangement as above described in which the shade feature is characterized by easy detachability from the remaining structure for the purpose of rendering the same usable only in the hotter seasons of the year.

A further object is to devise a structure of the character described which embodies the attributes of simplicity of design and low cost of construction, together with an adaptability for installation to a variety of vehicular structural conditions.

My invention is more particularly intended for application to motor vehicles of the closed type. Ventilation of the interior of such vehicles, without producing an annoying draft, and the protection of the occupants against the rays of the sun have proved troublesome problems and within recent years have been solved, so far as ventilation is concerned, by the use of a glass ventilator which spans the window opening at the top thereof and is angularly inclined to the plane of the opening. When the window is lowered some distance, the position relation between the ventilator and window permits the passage of a gentle current of air into the interior of the vehicle, which is satisfactory for ventilation.

Shade protection has been afforded by the use of a curtain which is supported across the window opening at the top thereof and extends downwardly and outwardly from the body of the vehicle for a predetermined distance. These shades have been found to be a virtual necessity, particularly on long drives where the sun's rays are directed continually on one side of the vehicle, thus constituting a source of discomfort and fatigue.

Despite the desirability of the foregoing accessories, present devices do not permit of their simultaneous use, as the attachment of either to a vehicle body precludes the use of the other, unless removed. My invention is intended to overcome this objection through comprising in a unitary construction the two features hereinbefore described. The ventilating portion of the device is attached permanently to the vehicle body and carries a shade which may be removed as desired. My improvement is accordingly capable of use throughout the year with the advantages noted above.

These and further objects of my invention will be set forth in the following specification, reference being had to the accompanying drawing, and the novel means by which said objects are effectuated will be definitely pointed out in the claims.

In the drawing:

Fig. 1 is an elevation of my improved structure showing its application to the window opening of a vehicle body.

Fig. 2 is a section along the line 2—2 in Fig. 1 looking in the direction of the arrows.

Fig. 3 is an enlarged plan view of a portion of the shade, looking in the direction of the arrow 3 in Fig. 2.

Fig. 4 is a view of a portion of Fig. 3, looking in the direction of the arrow 4 in said figure, and showing the manner of securing the ends of the shade frame rods.

Fig. 5 is an enlarged plan view of a portion of the ventilator, looking in the direction of the arrow 3 in Fig. 2.

Fig. 6 is an elevation of one of the shade brackets.

The numeral 10 represents the side of a vehicle body having an opening 11 which may be closed by a window 12, operating in the usual groove 13 formed in said body. The window 12 may be raised and lowered by the mechanism usually employed for this purpose, but which does not form any part of my invention and has therefore not been particularly illustrated or described.

In each of the upper, opposite corners of the opening 11 is secured a bracket 14 having an outwardly and downwardly extending arm 15 which is provided with a pocket 16. The pair of brackets 14 is formed in right and left hand members so that the pockets 16 face each other for the purpose of supporting across the opening 11 a ventilator 17 which is preferably formed of glass. It will be observed that by reason of the disposition of the arms 15, the ventilator is angularly disposed with reference to the window 12. On the lower end of the arm 15 is provided a perforated ear 18 and on the upper side of said arm, adjacent the top of the bracket 14, is provided a perforated lug 19, both being intended for a purpose hereinafter explained.

The foregoing structure is intended to be attached permanently to the vehicle and the manner in which the shade is secured thereto will now be explained. On each bracket 14 is carried a shade arm 20 through the medium of a flange 21 which extends downwardly therefrom and has formed thereon a flat surface 22 which rests along the upper side of the arm 15. At the lower end of said flange, a perforated ear 23 projects for registration with the ear 18, the two ears being bolted together. A finger 24 projects from the upper end of the arm 20 and is inserted through the opening in the lug 19. The arm 20 is thus firmly, but detachably, secured at two points and the shaping of the flange 21 is such as to obtain an angular disposition of the arms 15 and 20. Preferably, this angular relation and the length of the arm 20 are arranged so that the lower edge of the latter does not extend appreciably below the lower edge of the ventilator 17 for a purpose hereinafter explained.

The ends of the arm 20 are notched as at 25 for the reception of the ends of the rods 26 which are encased in seams 27 formed along the opposite sides of a curtain, or shade, 28. The opposite ends of said shade may be secured to the arms 20 by snap fasteners 29. This manner of constructing the shade feature of my invention is intended merely for purposes of illustration, as it is obvious that other methods may be employed without affecting the central idea involved.

As noted above, the ventilator is a permanent arrangement on the vehicle and, when the window 12 is lowered a slight amount, will function to adequately ventilate the interior without excessive draft. It is desirable, however, to provide shade protection for the occupants in conjunction with the ventilating feature and it will be obvious that my structure permits of this accomplishment. The use of one feature does not prevent the use of the other, as is now the practice in the art, while the design is so arranged as to secure the removal of the shade portion of the combination whenever desired. The arms 20 are made of sufficient length to insure adequate shade protection against the slanting rays of the sun, but do not extend downwardly to a distance that would interfere with the vision.

While I have shown one set of elements and combinations thereof for effectuating my improved arrangement, it will be understood that the same is for the purpose of illustration only and in no wise to limit my structure to the exact forms shown, for many changes may be made therein without departing from the spirit of my invention.

I claim:

1. Supporting means for a combination ventilator and shade for vehicles comprising a bracket attachable within the margin of the window opening for receiving one end of said ventilator and an arm carried by said bracket for mounting one end of said shade.

2. Supporting means for a combination ventilator and shade for vehicles comprising a bracket attachable within the margin of the window opening for receiving one end of said ventilator and an arm detachably carried by said bracket for mounting one end of said shade.

3. Supporting means for a combination ventilator and shade for vehicles comprising a bracket attachable within the margin of the window opening for receiving one end of said ventilator and an arm angularly disposed to said bracket for mounting one end of said shade.

In testimony whereof, I affix my signature.

J. PAUL SCHMIDT.